United States Patent
Khanna et al.

(10) Patent No.: US 7,219,187 B1
(45) Date of Patent: May 15, 2007

(54) SEARCH PARAMETER TABLE IN A CONTENT ADDRESSABLE MEMORY

(75) Inventors: Sandeep Khanna, Santa Clara, CA (US); James P. McDermott, San Mateo, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 0 days.

(21) Appl. No.: 10/232,576

(22) Filed: Aug. 30, 2002

(51) Int. Cl.
*G06F 12/00* (2006.01)

(52) U.S. Cl. .......................... 711/108; 711/156; 365/49
(58) Field of Classification Search .............. 711/108, 711/156; 365/49; 709/214
See application file for complete search history.

(56) References Cited

U.S. PATENT DOCUMENTS

| | | | | |
|---|---|---|---|---|
| 5,200,953 A | * | 4/1993 | Spataforc et al. | 370/429 |
| 5,249,282 A | * | 9/1993 | Segers | 711/122 |
| 5,440,715 A | * | 8/1995 | Wyland | 711/108 |
| 6,237,061 B1 | * | 5/2001 | Srinivasan et al. | 711/108 |
| 6,324,087 B1 | * | 11/2001 | Pereira | 365/49 |
| 6,374,326 B1 | * | 4/2002 | Kansal et al. | 711/108 |
| 6,538,911 B1 | * | 3/2003 | Allan et al. | 365/49 |
| 6,542,391 B2 | * | 4/2003 | Pereira et al. | 365/49 |
| 6,633,953 B2 | * | 10/2003 | Stark | 711/108 |
| 6,687,785 B1 | | 2/2004 | Pereira | |
| 6,711,041 B2 | | 3/2004 | Pereira et al. | |
| 6,732,227 B1 | * | 5/2004 | Baumann | 711/108 |
| 6,757,779 B1 | * | 6/2004 | Nataraj et al. | 711/108 |
| 6,763,425 B1 | | 7/2004 | Pereira | |
| 6,772,279 B1 | * | 8/2004 | Sun et al. | 711/108 |
| 6,831,850 B2 | | 12/2004 | Pereira et al. | |
| 6,934,795 B2 | | 8/2005 | Nataraj et al. | |
| 6,944,709 B2 | | 9/2005 | Nataraj et al. | |
| 2003/0039135 A1 | * | 2/2003 | Srinivasan et al. | 365/49 |
| 2003/0048785 A1 | * | 3/2003 | Calvignac et al | 370/392 |

OTHER PUBLICATIONS

TDB-ACC-NO: NN9302151, Memory Organization Scheme for the Implementation of Routing Tables in High Performance IP Routers, Feb. 1, 1993, IBM, pp. 1-6.*
Anthony J. McAuley & Paul Francis, Fast Routing Table Lookup Using CAMs, IEEE, 1993, pp. 1382-1391.*
PCT Search Report, PCT/US03/26486, filed Aug. 21, 2003.

* cited by examiner

*Primary Examiner*—Gary Portka
(74) *Attorney, Agent, or Firm*—Shemwell Mahamedi LLP

(57) ABSTRACT

A content addressable memory device having a search parameter table.

39 Claims, 11 Drawing Sheets

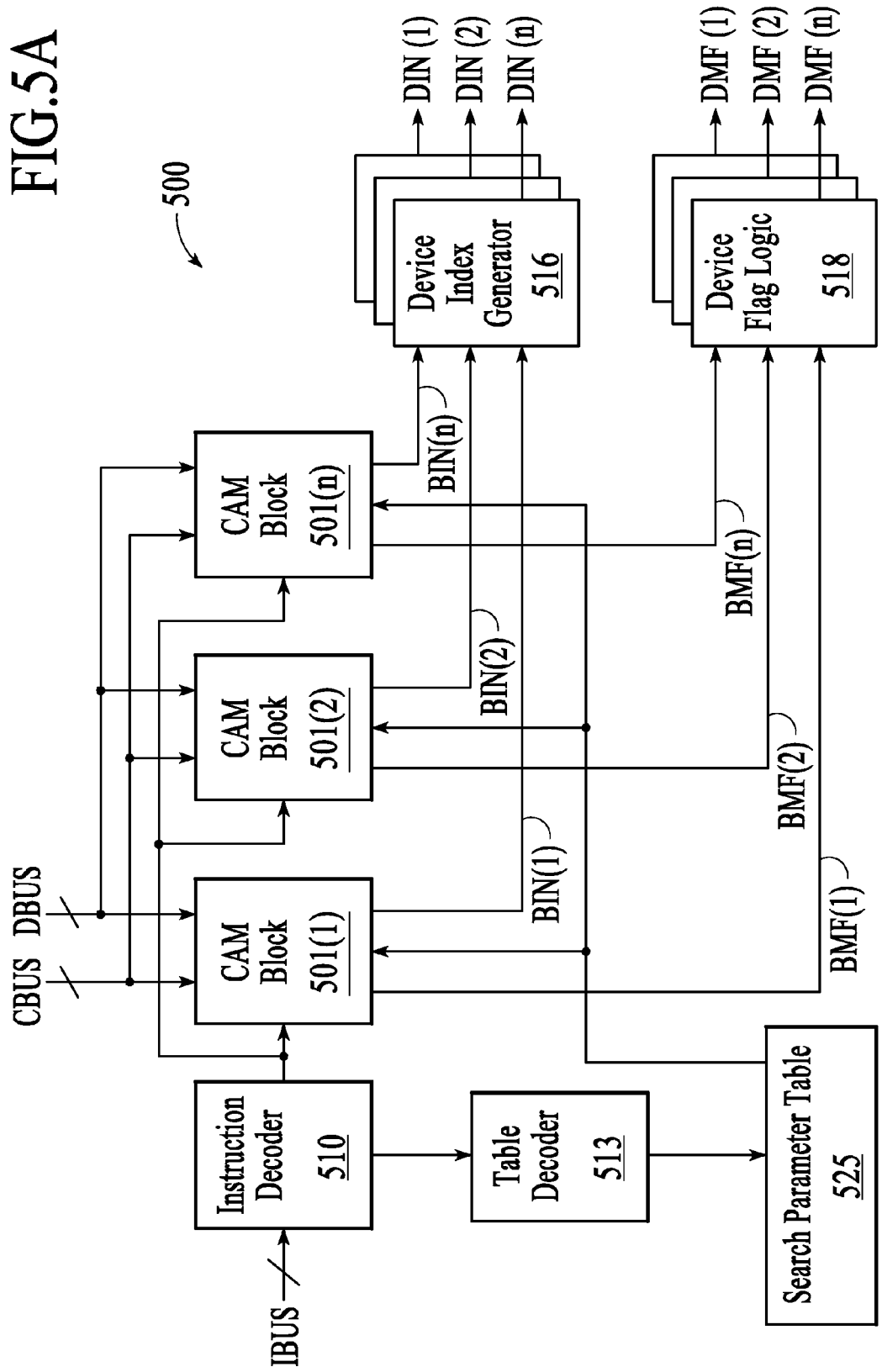

SEARCH PARAMETER TABLE IN A CONTENT ADDRESSABLE MEMORY

FIELD OF THE INVENTION

This invention relates generally to the field of memory devices. More specifically, the invention relates to content addressable memory devices.

BACKGROUND OF THE INVENTION

Networks contain a collection of computing systems (e.g., clients and servers) that are interconnected by transmission lines to enable the transfer of data between them. A network typically includes multiple access points (e.g., routers and servers) that may switch and/or route data between transmission lines to transfer data from a source to a destination. Data is typically transmitted in the form of packets that are made up of smaller data cells. A packet is a unit of data that is routed between a source and a destination on a packet-switched network. When a file (e.g., e-mail, graphics, etc.) is sent from one place to another on a network, the file is divided into such smaller packets making them more efficient for transmission. The individual packets for a given file may travel different routes throughout networks with each packet containing both data and transmission information associated with the routing of data. As such, a packet may be described as having a payload containing the data, and one or more headers that contain the routing information (e.g., a destination address).

When all the packets have arrived at a destination, they are reassembled into the original file at the receiving end. Such a packet switching scheme is an efficient way to handle transmission on a connectionless network. This is in contrast to a circuit switching scheme where a connection (e.g., a voice connection) requires the dedication of a particular path for the duration of the connection.

A router is a device (e.g., hardware, firmware, software) that determines the next network segment to which a packet should be forwarded towards its destination. A router may be positioned at points within a network or where one network meets another, referred to as a gateway. A router may create and maintain tables of the available routes and their conditions (routing tables) for use with other information to determine the best route for a given packet. Typically, a packet may travel through a number of network points having routers before arriving at its destination.

When a data packet arrives at the input of a router, several lookups may be performed by the router to determine the subsequent handling of the packet, as illustrated in FIG. 1. The lookups may include, for examples, where to send the packet next (Next Hop), the quality of service requirement (QoS), the Ethernet port address, etc. Consider, for example, a packet arriving at Router-A. Router-A needs to determine whether the packet is destined for local servers connected directly to Router-A, or if the packet should go to the next router on a route (Router-B) to a destination. Additionally, Router-A may assign a priority based on the destination address (DA) and the source address (SA) of the packet.

The packet header may first be parsed or processed to get the values from different fields (e.g., SA, DA, protocol type, QoS, etc) in order to perform the various lookups. A packet classification lookup, for example, may be performed using SA, DA and other relevant fields in the packet header. The Next Hop lookup, for example, may also be performed to determine whether the packet is meant for local servers or for Router-B. If the packet is destined for Router-B, the packet is then put in a queue for Router-B. If the packet is destined for a local server (e.g., Server-1 or Server-2), then a media access control (MAC) lookup is performed to send the packet to the appropriate server. In the preceding example, three lookups are necessary for sending the packet on its way: Packet Classification, Next Hop, and MAC. However, often there are other lookups performed on the packet header, with the number of lookups exceeding five or more.

Routers may use processors (e.g., network processor, control plane processor, microprocessor, etc.) and content addressable memory (CAM) devices to perform the various lookups on packets. The CAM device can be instructed by the processor to compare a search key, also referred to as a comparand (e.g., generated from packet header data), with data stored in its associative memory array. The CAM simultaneously examines all of its entries and selects the stored data that matches the key. As such, before a search can be performed, data must be stored in the CAM array.

When the entire CAM device is searched simultaneously for a match of the stored data with the key comparand data, the CAM device indicates the existence of a match by asserting a match flag using match flag logic, as illustrated in FIG. 2. Multiple matches may also be indicated by asserting a multiple match flag. The CAM device typically includes a priority encoder to translate the matched location into a match address or CAM index and outputs this address to a status register so that the matched data may be accessed. The priority encoder may also sort out which matching memory location has the top priority if there is more than one matching entry.

Data may be represented in the form of strings of binary digits ("bits") having a low ("0") logic state and a high ("1") logic state. Different types of CAM devices may be used with different data formats. A binary CAM is designed to operate with "0" and "1" states, while a ternary CAM is designed to operate with "0", "1", and "don't care" states. The bits may be organized into groups such as a word (e.g., 64 or 72 bits wide) and stored in different segments of a CAM device. The search keys used for different data fields may have different word sizes, for example, the search key for a Classification lookup may be 128 bits wide and the search key for a Next Hop lookup may be 32 bits wide.

A CAM device may include multiple blocks with each block storing a different table, for performing a different lookup. For example, a router may include a 32 bit wide Next Hop CAM block, a 128 bit Classification CAM block, and a 48 bit MAC CAM block. Each of the multiple CAM blocks within a CAM device are typically connected to common data and instruction buses that are used to communicate the various keys and other input and output data with the processor. The search key is usually provided together with instructions to the CAM device on the instruction bus. The instructions typically contain information about the blocks contained within the CAM device, for example, block or table identifiers and global masking identifiers associated with a particular search.

Some prior art CAM devices utilize large instruction bus widths in order to receive such information. For example, if 2 bits are used to designate a block ID and 3 bits are used to designate global masking ID, then an instruction bus would need to be at least 5 bits. If multiple, concurrent searches were supported, and each compare operation could identify a unique table identifier/global mask combination, the width of the instruction bus may be undesirably increased to simultaneously accommodate all of the compare instructions. As the number of lookups increases, such CAM device architectures could undesirably limit the system's overall throughput.

BRIEF DESCRIPTION OF THE DRAWINGS

The present invention is illustrated by way of example and not intended to be limited by the figures of the accompanying drawings.

FIG. 5A illustrates one embodiment of a CAM device with a search parameter table.

DETAILED DESCRIPTION

Figure 1:
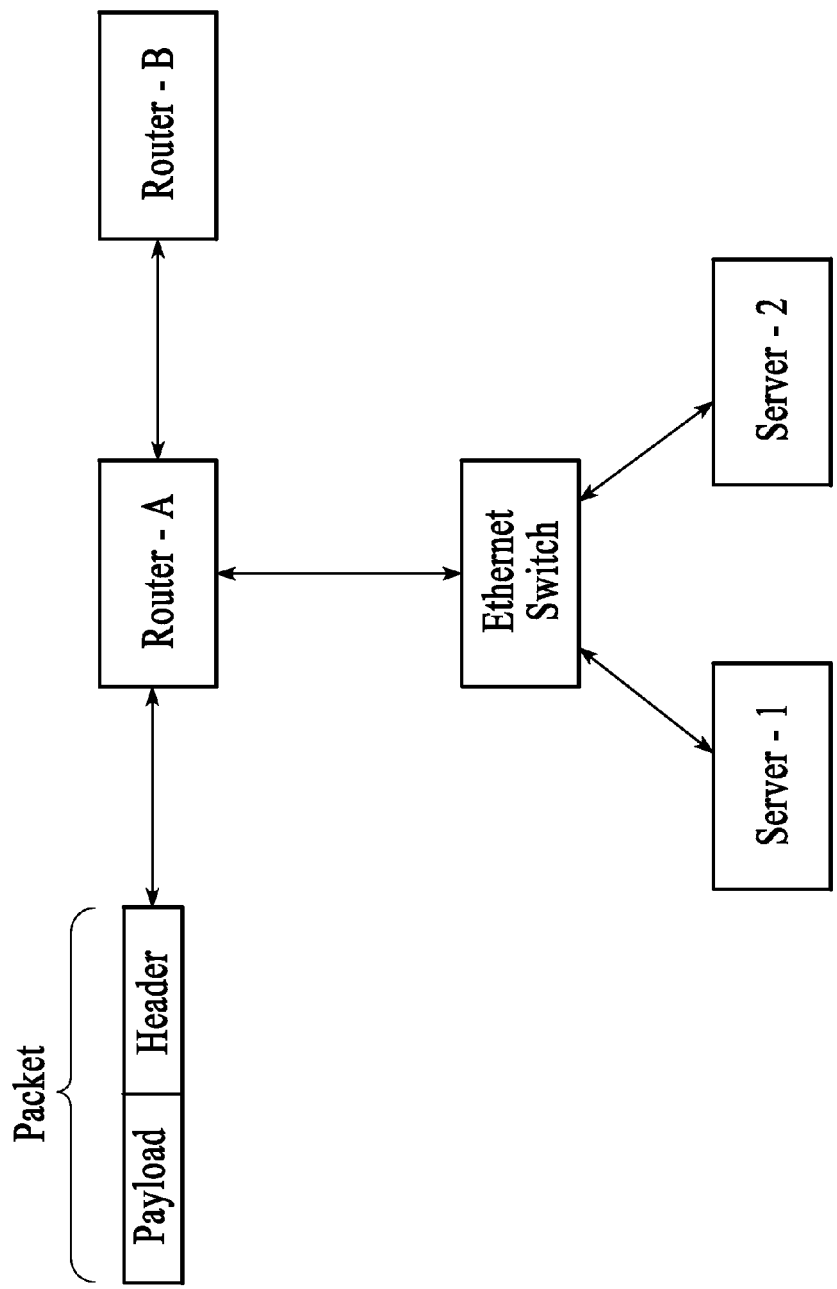
FIG. 1 illustrates an example of packet handling by a router.
Figure 2:
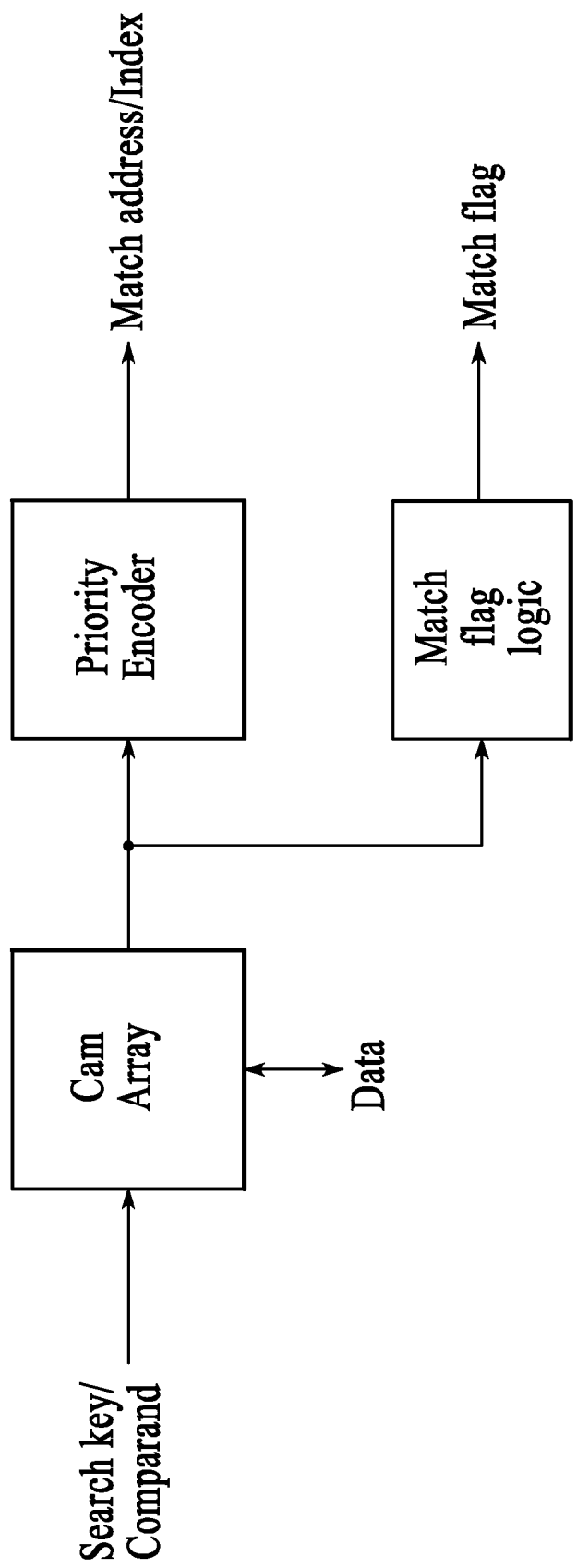
FIG. 2 illustrates components a conventional CAM device.

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Embodiments of the present invention include various method steps, which will be described below. The steps may be performed by hardware components or may be embodied in machine-executable instructions, which may be used to cause hardware components (e.g., a processor, programming circuit, etc.) programmed with the instructions to perform the steps. Alternatively, the steps may be performed by a combination of hardware and software.

Embodiments of the present invention may be provided as a computer program product, or software, that may include a machine-readable medium having stored thereon instructions. The machine readable medium may be used to program a computer system (or other electronic devices) to generate articles (e.g., wafer masks) used to manufacture embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The machine readable medium may store data representing an integrated circuit design layout that includes embodiments of the present invention. The design layout for the integrated circuit die may be generated using various means, for examples, schematics, text files, gate-level netlists, hardware description languages, layout files, etc. The design layout may be converted into mask layers for fabrication of wafers containing one or more integrated circuit dice. The integrated circuit dice may then be assembled into packaged components. Design layout, mask layer generation, and the fabrication and packaging of integrated circuit dice are known in the art; accordingly, a detailed discussion is not provided.

It should be noted that the methods and apparatus discussed herein may be implemented with one or more bits or bit groups (with each bit group containing one or more bits). In addition, the steps and operations discussed herein (e.g., the loading of registers) may be performed either synchronously or asynchronously. The term "coupled" as used herein means connected directly to or connected through one or more intervening components or circuits.

A content addressable memory (CAM) device having multiple CAM blocks and a search parameter table is described. The search parameter table is configured to store search parameters to be used in performing, for example, concurrent compare operations in the multiple CAM blocks. The search parameters instruct the CAM device of the manner in which to perform one or more compare operations. For example, the search parameters may include CAM table identifiers (IDs) associated with one or more of the CAM arrays participating in a compare operation and global mask IDs corresponding to the particular global mask to be used in a corresponding compare operation.

Rather than providing the CAM table IDs and global mask IDs in the instruction itself, over an instruction bus (IBUS), such parameters are pre-programmed into the search parameter table. The parameters may be selected using a selection code transmitted to the CAM device on the instruction bus. The selection code is used to select the desired pre-programmed parameter information stored in the search parameter table. The selection code, preferably, has a fewer number of bits than the parameter information that the code selects.

Advantageously, a smaller IBUS (fewer IBUS input pins on the CAM device) can be utilized when compared with other CAM devices that provide both the search parameters explicitly over the IBUS. For example, use of the search parameter table can be particularly advantageous for CAM devices that can perform multiple concurrent compare operations because the number of input pins of the CAM device can be reduced to accommodate the selection code. Without the search parameter table, a user would need to provide all of the search parameters (e.g., CAM table IDs and global mask register IDs for all of the compare operations) directly on the IBUS or other bus such as a data bus.

Figure 3:
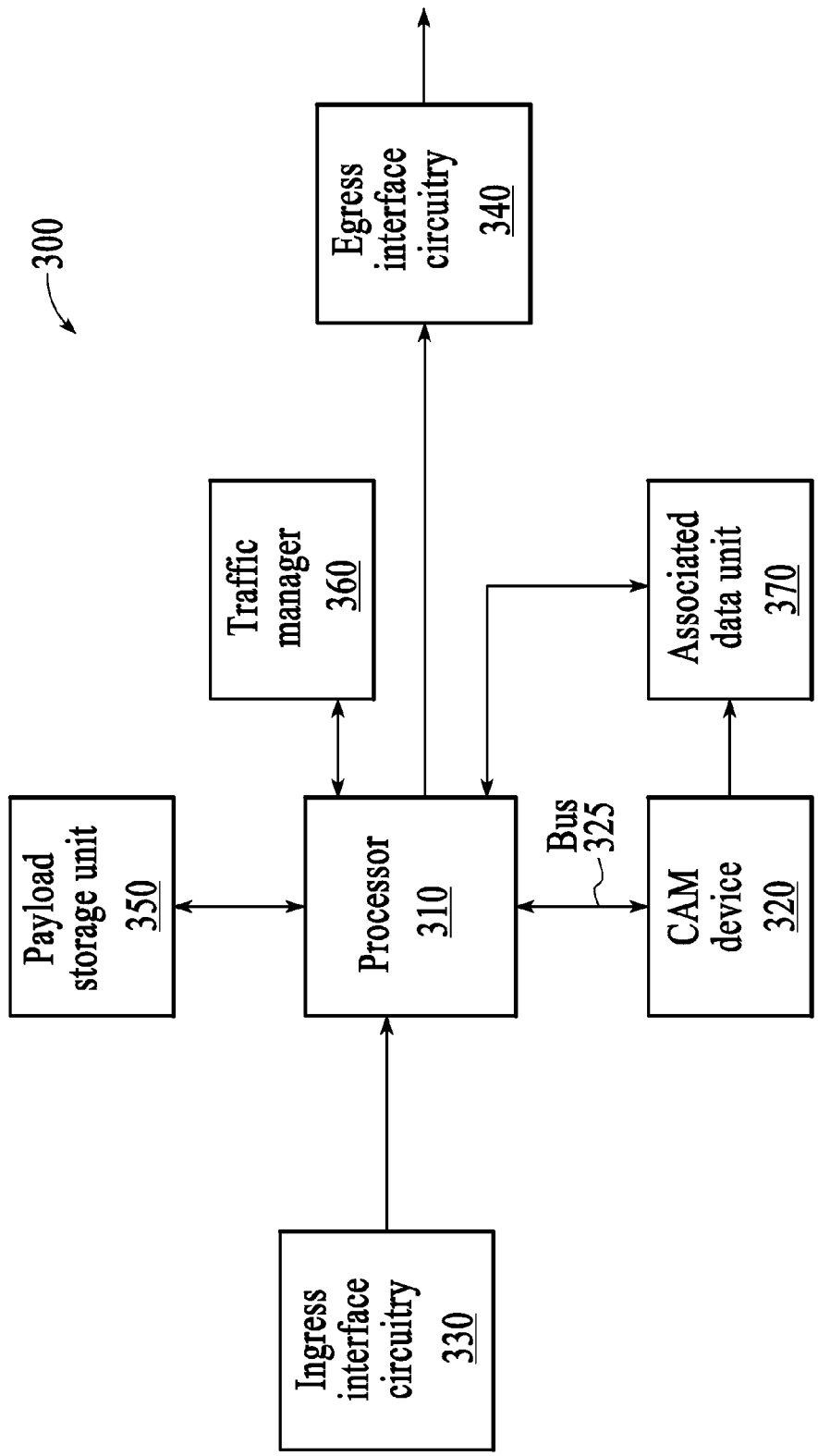
FIG. 3 illustrates one embodiment of a line card or blade of a router having a CAM device configured according to one embodiment of the present invention.

FIG. 3 illustrates one embodiment of a line card or blade of a router having a CAM device. Line card 300 includes processor 310, ingress interface circuitry 330, egress interface circuitry 340, CAM device 320, associated data storage unit 370, traffic manager 360, and payload storage unit 350.

Processor 310 functions to control the overall operation of line card 300 in cooperation with the other components of line card 300. For example, processor 310 receives packets from a network medium through ingress interface circuitry 330, stores the payload of packets in payload storage unit 350, and processes packet header information to determine required lookups in CAM device 320 and subsequent handling of the packets, as discussed herein. Ingress circuitry includes, for example, PHY and MAC devices. Processor 310 sends out packets on a network medium through egress interface circuitry 340 based on the lookups performed by CAM device 320. Egress interface circuitry 340 may be connected to a switch fabric or directly to one or more other routers or switches. Processor 310 may be one or more network processor units (NPUs), microprocessors, or one or more special purpose processors such as a digital signal processor (DSP). In another embodiment, processor 310 may be another type of controller, for example, a field programmable gate array (FPGA), application specific integrated circuit (ASIC), or a general purpose processor. The processor 310, ingress interface circuitry 330, and egress interface circuitry 340 components of a router are known in the art; accordingly, a detailed discussion is not provided.

In response to information in a packet header, for a particular packet, processor 310 determines the number and types of lookups to be performed by one or more of CAM devices 320, and forms the search keys for these lookups. The searches or lookups may include, for example, classification lookups, forwarding lookups (e.g., Next Hop or longest prefix match (LPM) lookup, MAC lookup, MPLS lookup, etc.) or any other types of lookups. When multiple searches are required, processor 310 may form a composite search key that includes at least two, and as many as all, of the various search keys for the lookups. The composite search key is provided as a common input data to CAM device 320. CAM device 320 selectively identifies and extracts the individual search keys from the common input data and provides the individual search keys to the associated CAM blocks to perform the lookups. The lookups may then occur concurrently or simultaneously (e.g., overlapping at least one moment in time) in the CAM blocks of CAM device 320, thereby increasing overall throughput over conventional systems in which searches are processed sequentially. Alternatively, the lookups may be performed sequentially.

CAM device 320 may be a multiple block CAM device with each block capable of storing a different table for a different type or class of lookups. Alternatively, CAM device 320 may represent multiple, single block CAM devices (e.g., with each single block CAM device formed on a different integrated circuit substrate) with each CAM device used to store a different table. After one or more lookups are executed in CAM device 320, associated information for matching entries (e.g., additional routing information and/or packet information) may be retrieved from associated data unit 370. Associated Data unit 370 may be directly accessed by CAM device 320 and/or by processor 310. Processor 310 then communicates with traffic manager 360 to schedule the exit of a packet from line card 300 via egress interface circuitry 340.

Figure 4:
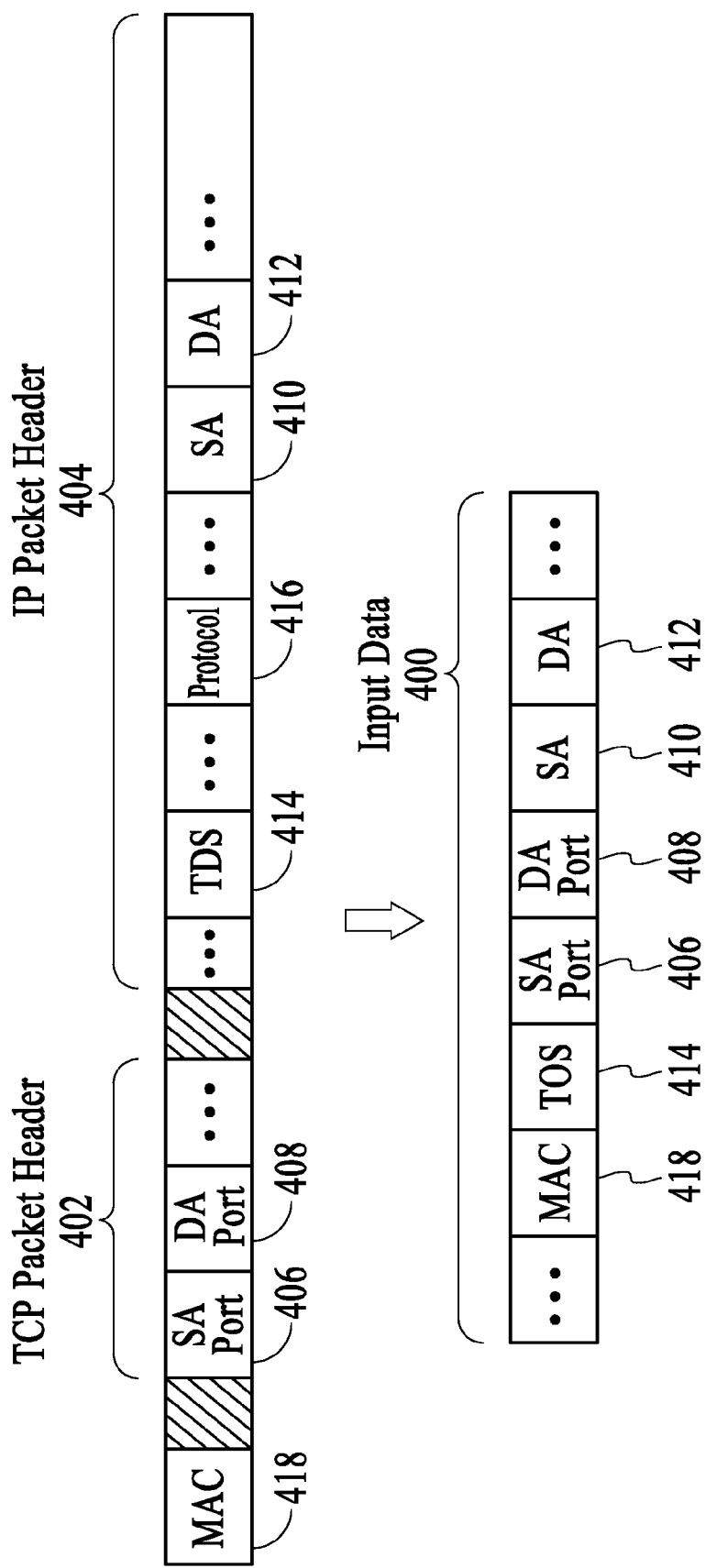
FIG. 4 illustrates one embodiment of input data.

FIG. 4 illustrates one embodiment of input data. Input data 400 includes field segments parsed or processed from one or more packet headers 402 and 404. When data processing systems (e.g., routers, clients, servers) exchange data over a network, the procedure involves the use of protocols by which these systems agree on how to communicate with each other. To reduce design complexity, networks may be organized as a series of layers. The number of layers and the function of each layer varies from network to network.

For example, where a transmission control protocol (TCP)/Internet protocol (IP) is used, it is organized into multiple layers including a network access layer and an Internet layer. The network access layer uses a TCP to enable the exchange of data between an end system and a network. An Internet layer uses an IP to enable data to traverse multiple interconnected networks. Each of these protocols uses packet headers containing routing information, as discussed above. For example, TCP packet header 402 includes a source address (SA) port segment 406 and a destination address (DA) port segment 408, and IP packet header 404 includes a SA segment 410, a DA segment 412, a type of service (ToS) segment 414, and a protocol type segment 416.

In one embodiment, for example, processor 310 of FIG. 3 may be used to parse certain segments from packet headers 402 and 404 to generate input data 400 and transmit the input data to CAM device 320. For example, input data 400 may include MAC segment 418, TOS segment 414, SA port segment 406, DA port segment 408, SA segment 410, and DA segment 412. Alternatively, input data 400 may include more or less than the segments illustrated. In one embodiment, processor 310 may transmit unparsed header segments to CAM device 320.

FIG. 5A illustrates CAM device 500 that is, for example, one embodiment of CAM device 320 of FIG. 3. CAM device 500 includes instruction decoder 510, table decoder 513, search parameter table 525, one or more index generator(s) 516, one or more flag logic circuit(s) 518, and CAM blocks 501(1)–501(n), where n can be any number. Additional circuits such as, for example, error detection logic, multiple match flag logic, full flag logic, almost full flag logic, etc. may also be used. Alternatively, the flag logic may be omitted.

Instruction decoder 510 decodes various instructions provided on instruction bus IBUS (e.g., instructions to write or read data from a CAM block and to compare comparand data with one or more segments of a CAM array within a CAM block), and provides various control and/or timing signals to each of the CAM blocks, index generator(s) 516, device flag logic 518, table decoder 513, and/or search parameter table 525. The instruction decoder may be, for example, a look-up table, state machine or other control logic.

As discussed above in relation to CAM 320 of FIG. 3, each of blocks 501(1)–501(n) may be an entire array, a portion of a larger array, or include multiple arrays. Each array in a block may store a different lookup table or portions of one or more common lookup tables. For example, blocks 501(1) and 501(2) may store one lookup table and block 501(n) may store a different lookup table. Alternatively, a block may store multiple lookup tables.

Each of the CAM blocks 501(1)–501(n) stores a CAM table ID that contains information related to the particular CAM block. An array in a block associated with each lookup table is assigned a unique CAM table ID that identifies information stored in the table such as table configuration (i.e., effective width and depth for compare operations), type of data stored in the table (e.g., IP forwarding, classification data, MPLS, MAC lookup, etc.), or other table parameters. Each search operation communicated over the IBUS identifies one or more tables to be searched based on their CAM table IDs as will be described in more detail below. Where a block contains multiple lookup tables, additional techniques may be used to uniquely identify the lookup tables during searches (e.g., using tag bits or multiple CAM table IDs).

Alternatively, a CAM table ID may contain other information such as a block number that represents the physical address of the block. For example, if CAM device 500 contains four CAM blocks 501(1)–501(4), then CAM block 501(1) may be assigned an block number of 00, CAM block 501(2) may be assigned a block number of 01, CAM block 501(3) may be assigned a block number of 10, and CAM block 501(4) may be assigned a block number of 11. The block numbers may correspond to block addresses.

Figure 6:
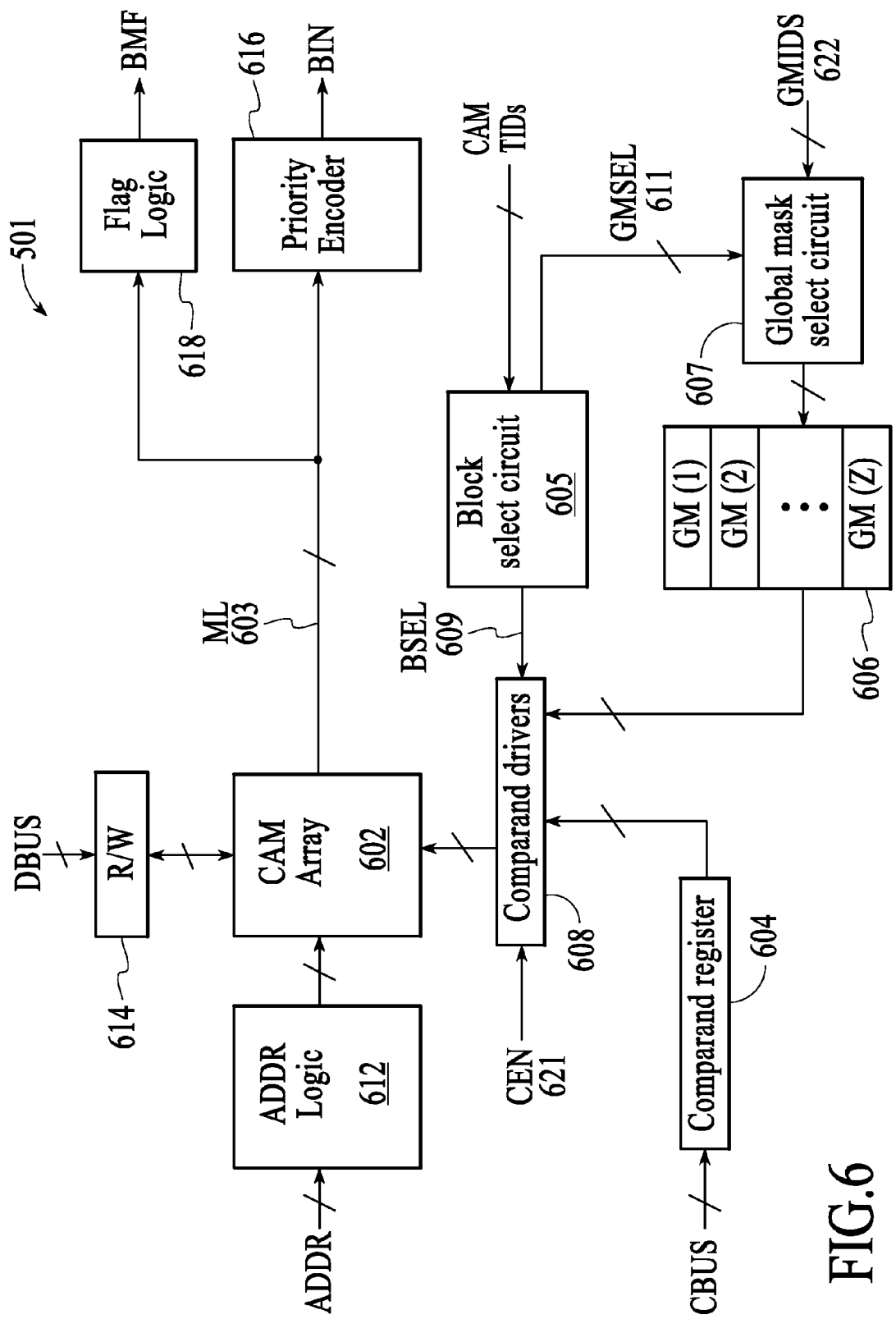
FIG. 6 illustrates one embodiment of a CAM block.

Each of CAM blocks 501(1)–501(n) may also include global mask registers (e.g., as shown in FIG. 6) that may be used to store mask information that masks (i.e., effectively disables the bits in the column from affecting a lookup operation) certain columns of the CAM array in each CAM block during a lookup. Each global mask register may be used to mask one or more different sets of columns of the CAM array. The global mask associated with each register is given a global mask ID that uniquely identifies the particular global mask.

Each of CAM blocks 501(1)–501(n) may also include flag logic (e.g., as shown in FIG. 6) that asserts a corresponding block match flag BMF(1)–BMF(n) to a match state when the CAM block includes data that matches comparand data and the CAM block has the same CAM table ID for a given compare operation. The block match flags are provided to one or more device flag logic circuits 518 that generate device match flags DMF(1)–DMF(r) that each indicate whether any of the CAM blocks associated with a corresponding CAM table ID for a given compare operation have a match. Additional flag logic such as almost full flag logic, full flag logic, and/or multiple match flag logic may also be included in CAM device 500.

Each of CAM blocks 501(1)–501(n) may also include priority encoding logic (e.g., as shown in FIG. 6) to translate a matched location into a block match address or index for the block (BIN(1)–BIN(n)). The priority encoder of a block may also sort out which matching memory location has the top priority if there is more than one matching entry within an array of the CAM block. The block match indices are provided to one or more device index generators 516 that determine one or more device indices DIN(1)–DIN(r) that each corresponds to the highest priority block index (for a given CAM table ID) from among the block indices associated with matches. The block match flags may also be provided to the device index generator(s), for example, to resolve which index is the highest priority index from CAM block that have matches during a compare operation.

Search parameter table 525 stores search parameters associated with particular CAM blocks for one or more (e.g., concurrent) compare operations. The search parameters instruct the CAM device 500 of the manner in which to perform one or more compare operations. For example, the search parameters may include the CAM table IDs of corresponding tables stored in one or more CAM arrays participating in a compare operation and global mask IDs corresponding to the particular global mask to be used in the particular compare operation. In alternative embodiments, search parameters may include other types of search information, for example, filter circuit IDs of filter circuits to be used in a particular compare operation, as discussed in further detail below in relation to FIG. 9. The search parameters are stored in storage elements of search parameter table 525. The number of search parameter table 525 storage elements can range from one to m. The number of concurrent compare operations represented by the search parameter table storage elements can range from one to m.

Figure 5B:
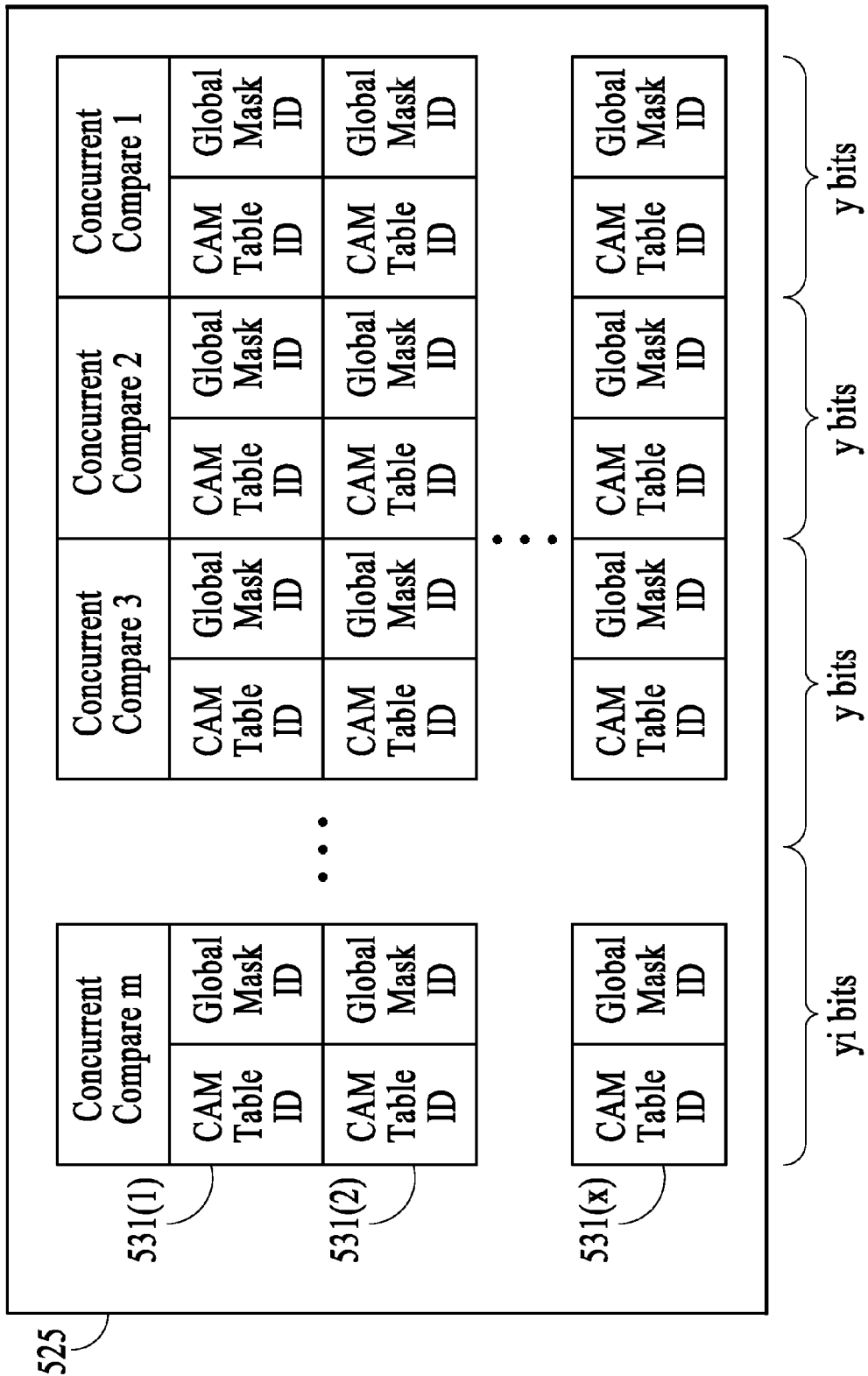
FIG. 5B is a conceptual illustration of one embodiment of a search parameter table.

FIG. 5B is an exemplary conceptual illustration of one embodiment of a search parameter table. In this embodiment, for example, search parameter table 525 includes multiple registers 531(1)–531(x). Alternatively, other types of storage elements may be used for search parameter table 525.

Each of registers 531(1)–531(x) store the search parameters CAM table ID and global mask ID for multiple concurrent compare operations (e.g., Compare 1–Compare m) to be performed in CAM blocks 501(1)–501(n). Y-bits may be used to represent a CAM table ID and global mask ID. As such, each of registers 531(1)–531(x) has a size of y multiplied by m. Registers 531(1)–531(x) of search parameter table 525 are pre-programmed with the CAM table ID and global mask ID. Note that while the example in FIG. 5B uses "concurrent compare" operations, such that all compares of a selected register are performed concurrently, each of Compares 1–m may be performed sequentially or a subset of the compares may be performed concurrently while others are performed sequentially.

Rather than providing the CAM table ID and global mask ID in an instruction, itself that is received on IBUS, such search parameter information is pre-programmed into the search parameter table 525 and selected using a selection code that, preferably, has a fewer number of bits than the search parameter information. The selection code is transmitted to the CAM device 500, for example, on the IBUS. Alternatively, the selection code may be transmitted on a different bus. The selection code is decoded by the table decoder 513 in order to select the desired pre-programmed parameter information from the search parameter table 525 (e.g., one of registers 531(1)–531(x)). For another embodiment, the decode function performed by table decoder 513 may be performed by instruction decoder 510 and the table decoder removed. For still another embodiment, the selection code may be provided to the CAM device already decoded.

For one example, if the selection code decoded by table decoder 513 selects register 531(1) and m=4, a compare operation is performed on the CAM block(s) assigned to each of the four CAM table IDs stored in 531(1) using the associated four global mask IDs also stored 531(1). For one example, a first CAM table ID may correspond to an IP forwarding table stored in CAM block 501(1), a second CAM table ID may correspond to an IP classification table stored in CAM block 501(2), a third CAM table ID may correspond to a multicast table stored in CAM block 501(3), and a fourth CAM table ID may correspond to an MPLS table stored in CAM block 501(4) and 501(5).

Advantageously, a smaller IBUS (fewer IBUS input pins on the CAM device) can be utilized when compared with other CAM devices that provide both the search parameters explicitly over the IBUS. For example, use of the search parameter table 525 can be particularly advantageous for CAM devices that can perform multiple concurrent compare operations because the number of input pins of the CAM device can be reduced to accommodate the selection code. Without the search parameter table 525, a user would need to provide all of the search parameters (e.g., CAM table IDs and global mask IDs for all of the compare operations) directly on the IBUS or other bus such as a data bus.

Also advantageously, the number of concurrent compare operations can be expanded without increasing the number of registers in search parameter table 525. Rather, only the size of each of registers 531(1)–531(x) needs to be increased to accommodate additional compare operation instructions.

FIG. 6 illustrates one embodiment of a CAM block of FIG. 5A. CAM block 501 includes address logic 612, CAM array 602, read/write (R/W) circuitry 614, priority encoder 616, flag logic 618, comparand register 604, comparand drivers 608, block select circuit 605, global mask (GM) registers 606, and GM select circuit 607.

CAM array 602 is an array of CAM cells that includes any number of rows of CAM cells that may be any type of CAM cells including, for example, binary and ternary NAND and NOR based cells that may be formed from either volatile or non-volatile elements. Each CAM cell includes at least one memory storage element and at least one compare circuit. Other embodiments may be used to effectively implement an array of CAM cells.

Data to be written to CAM array 602 may be received from DBUS. The data is written to CAM array 602 by read/write circuitry 614 and address logic 612. Address logic 612 selects one or more rows of CAM cells in response to an address provided over ADDR. The write data is provided to the selected cells (e.g., over one or more data bit lines) by the write circuitry portion of read/write circuitry 614 (e.g., write buffers). The read circuitry portion of read/write circuitry 614 (e.g., sense amplifiers) enables data to be read from one or more selected rows of CAM array 602. The data read from CAM array 602 may be output from the read/write circuitry 614 on the DBUS or any other bus (e.g., RBUS and CBUS).

During a compare operation, CAM array 602 is searched for a match with a comparand or search key. The comparand may be stored in a comparand storage element, for example, comparand register 604 before a compare operation (lookup) in CAM array 602 is performed. Alternatively, the comparand may be provided directly to CAM array 602 through comparand drivers 608 without being stored in comparand register 604. A compare enable (CEN) signal 621 received, for example, from instruction decoder 510, is provided to comparand drivers 608 to indicate when a compare operation may occur in CAM array 602. The comparand may be generated, for example, by processor 310 of FIG. 300. The comparand may be, for example, input data 400 of FIG. 4.

Block select circuit 605 outputs block select signal BSEL 609 that enables (together with CEN 621) comparand drivers 608 to drive the comparand data into CAM block array 602 to participate in a compare operation if a stored CAM table ID for the CAM array 602 matches one of the CAM table IDs provided from the search parameter table 525. Conversely, BSEL 609 disables the corresponding CAM array 602 if the stored CAM table ID for the CAM array 602 does not match one of the CAM table IDs provided from the search parameter table 525. The stored CAM table ID may be stored in block select circuit 605, in CAM Array 602, or elsewhere in the block. Block select circuit 605 also outputs global mask select circuit signals GMSEL 611 to global mask select circuit 607. Each global mask select signal is associated with a particular CAM table ID provided from search parameter table 525, and indicates whether the CAM table ID from search parameter table 525 matches the stored CAM table ID for the block. If a particular CAM table ID from search parameter table 525 matches the stored CAM table ID for the block, global mask select circuit 607 selects the corresponding global mask ID (GMID 622) from search parameter table 525 in response to the activated GMSEL signal. The selected GMID is used to select a corresponding global mask GM(1)–GM(z) from the global mask register 606 that globally masks the comparand data during a compare operation. For one embodiment, the comparand data is globally masked by the selected global mask data by logically ANDing together the selected global mask data on a bit-for-bit basis with corresponding bits of the comparand data in the comparand drivers 608. In an alternative embodiment, global masks and global mask registers need not be used.

The BSEL 609 may also be provided to one or more of the other components in CAM block 501 to selectively enable/disable such components (e.g., block priority encoder 616, the block match flag logic 618, and/or comparand register 604).

Figure 7:
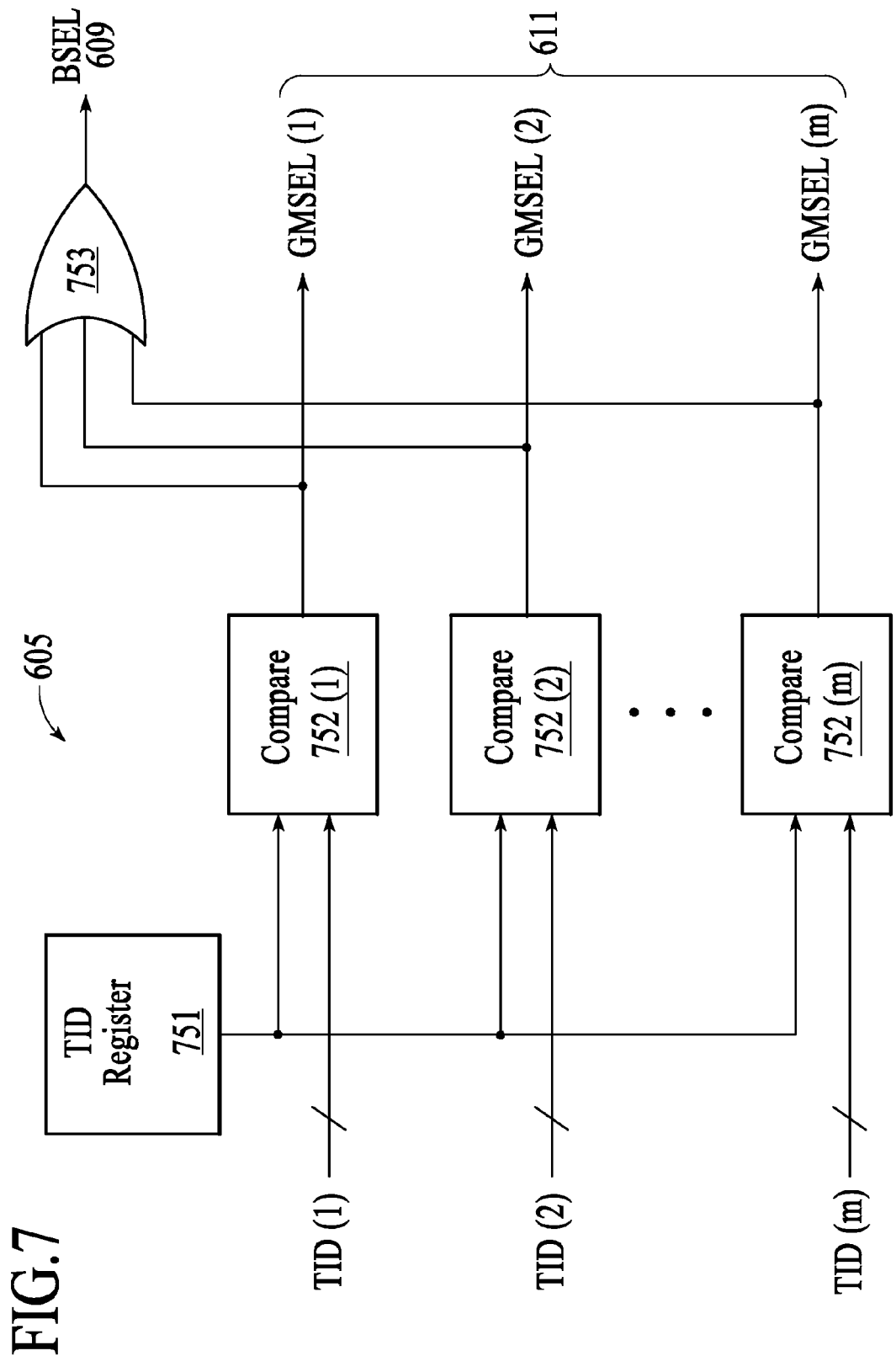
FIG. 7 illustrates one embodiment of a block selection circuit.

FIG. 7 illustrates one exemplary embodiment of block select circuit 605. In this embodiment, block select circuit 605 includes a CAM table ID (TID) storage element (e.g., a register) 751, compare circuits 752(1)–752(m), and logic gate 753. The TID register 751 stores the table ID of its corresponding CAM array 602. The compare circuits 752(1)–752(m) are configured to receive CAM table IDs from search parameter table 525 and compare them against the CAM table ID stored in register 751 for a match. Compare circuits 752(1)–752(m) output GMSEL signals GMSEL(1) –GMSEL(m), which are also provided to logic gate 753 to generate BSEL 609. Alternatively, block select circuit 605 may have other components and circuit configurations to perform its operation.

Figure 8:
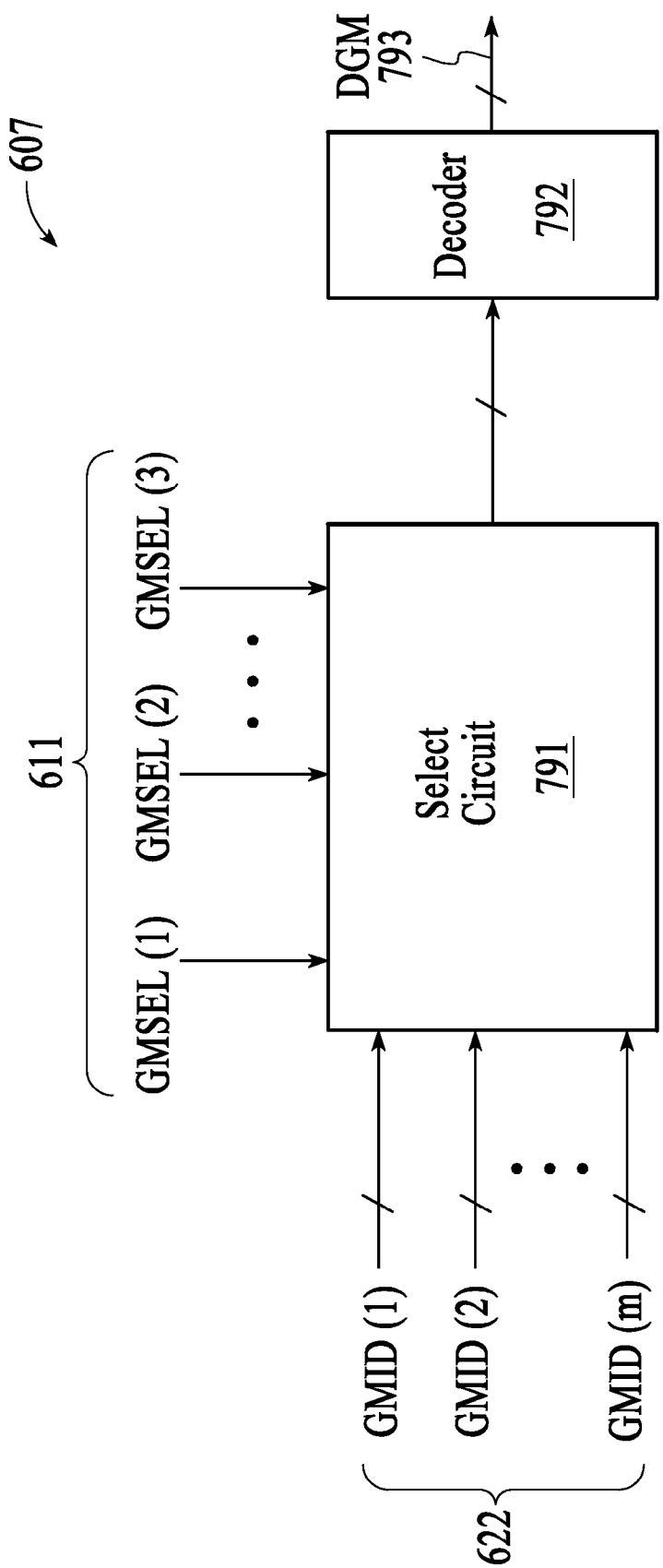
FIG. 8 illustrates one embodiment of a global mask selection circuit.

FIG. 8 illustrate one exemplary embodiment of global mask select circuit 607 that includes a select circuit 791 (e.g., a multiplexer) to receive the GMSEL signals 611 and the GMIDs 622. Select circuit 791 selects the particular global mask ID GMID(1)–(m) received from search parameter table 525 that associated with the corresponding activated global mask select signal GMSEL(1)–GMSEL(m) received from block select circuit 605. The selected one of the GMIDs is output to decoder 792 that decodes the GMID to produce DGM 793 that is used to select from among the global mask GM(1)–GM(z) stored in global mask registers 606.

Alternatively, global mask select circuit 607 may have other components and circuit configurations to perform its operation. Alternatively, the global mask ID from search parameter table 525 may be decoded by global mask select circuit 607 and then directly enable (e.g., by decoding) the appropriate global mask in global mask registers 606.

Referring again to FIG. 6, during a compare operation, when CAM array 602 is searched for a match of the stored data with the comparand stored in comparand register 604, each matching location indicates a match on one of match lines 603. Match flag logic 618 indicates the existence of a match on block match flag BMF if at least one of the match lines 603 carries a match signal indicating a match. Additional flag logic such as almost full flag logic, full flag logic, and/or multiple match flag logic may also be included in CAM block 501.

Priority encoder logic 616 translates a matched location(s) into a block index BIN (or a match address) and outputs this block index. The block index may be used, for example, by processor 310 of FIG. 3 or to access associated data unit 370 of FIG. 3. Priority encoder logic 616 also identifies which matching location has the top priority if there is more than one matching entry.

Various control and/or timing signals to address logic 612, read/write circuitry 614, and comparand register 604 may be provided by instruction decoder 510 of FIG. 5A to control when CAM block 501 performs an operation (e.g., a read, write or compare operation). Instruction decoder 510 may also provide various control and/or timing signals to CAM array 602, priority encoder 616 and match flag logic 618. In an alternate embodiment, instruction decoder 610 is omitted and various read, write and compare control signals are provided directly to one or more of the circuit blocks.

Note that any of the signals provided over IBUS, DBUS, CBUS or ADDR may be time multiplexed with other signals and provided over one or more of the other buses. The buses may be coupled to processor 310 as represented by bus 325 of FIG. 3.

Referring again to FIGS. 5A, 5B and 6, in one embodiment, one or more filter circuits may be used to select one or more bits or group of bits of different segments of an input data (received from processor 310) to generate different comparands. This may be used, for example, to concurrently perform different lookups in the CAM blocks 501(1)–501(n). The filter circuit can output the selected bit(s) to comparand register 604 in the same order as received over the CBUS, or in a different order. The global mask register (s) 606 are used to mask, for example, unused columns of the CAM array 602 corresponding to the filtered bits of the input data.

In one embodiment, the filter circuit may be a cross-bar switch that includes one or more programmable circuit elements (e.g., programmable memory storage elements) that can be programmed to select one or more bits or groups of bits of the input data and generate the output data with the selected one or more bits or group of bits. Alternatively, filter circuit may be any one of various types of circuits used to generate output data (e.g., by switching, filtering, translating, compacting, duplicating, and/or transposing, etc.) from an input data, according to its programming. Alternatively, the filter circuit may be coupled directly to the CAM array without the use of a comparand register 604.

Figure 9:
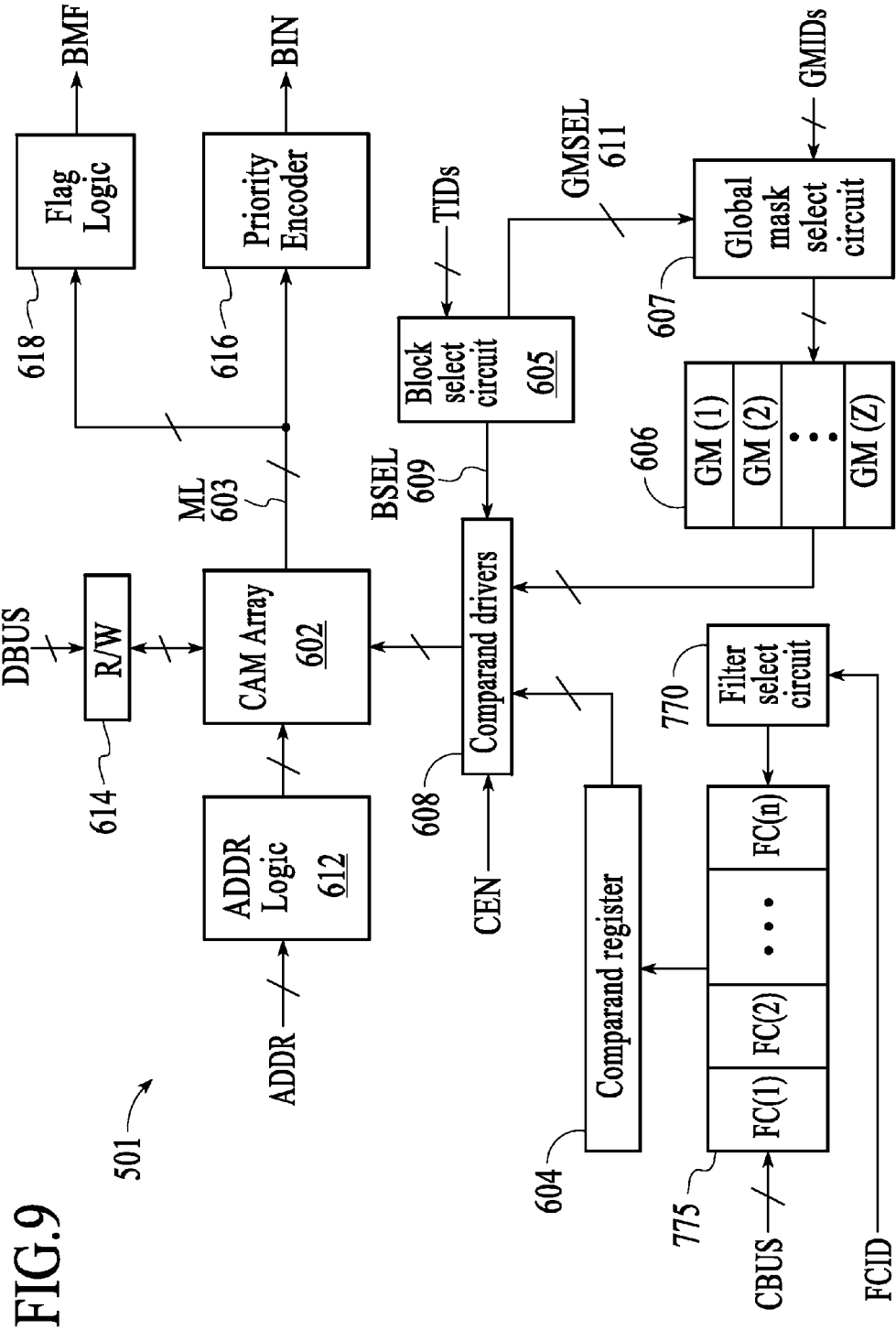
FIG. 9 illustrates an alternative embodiment of a CAM block.

FIG. 9 illustrates an alternative embodiment of a CAM block. In this embodiment, CAM block 501 includes multiple filter circuits FC(1)–FC(w) 775 coupled to a filter select circuit 770. Each filter circuit (FC) of filter circuits 775 may be assigned a filter circuit ID. In such an embodiment, the search parameters stored in search parameter table 525 may also include the filter circuit IDs. When selecting a particular CAM block/array for a compare operation, a user may also select a particular FC from among filter circuits 775 to filter the input data received on the CBUS to generate the comparand used in a compare operation. Alternatively, a single filter circuit may be used, and filter select circuit 770 and FCIDs may not be needed.

Figure 10:
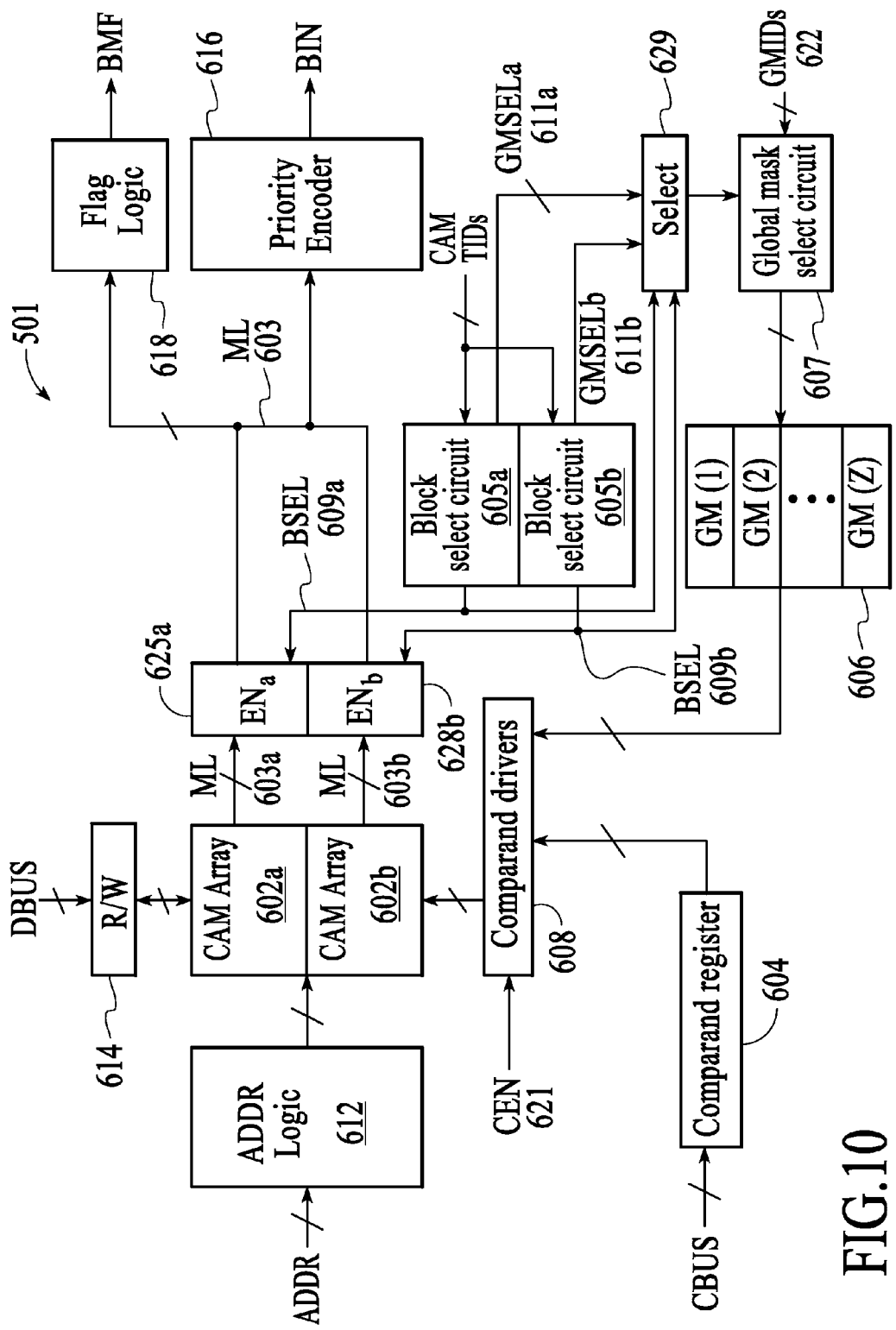
FIG. 10 illustrates one embodiment of a CAM block having multiple arrays.

FIG. 10 illustrates one embodiment of a CAM block having multiple arrays. As previously mentioned, a CAM block may contain multiple arrays, or tables. In this embodiment, for example, CAM block 501 includes two arrays: CAM array 602a and CAM array 602b. Each of CAM arrays 602a and CAM array 602b is used to store a separate table and, thus, has a separate CAM table ID associated with it. The CAM table ID of CAM array 602a may be stored in corresponding block select circuit 605a (or elsewhere), the CAM table ID of CAM array 602b may be stored in corresponding block select circuit 605b (or elsewhere).

CAM arrays 602a and CAM array 602b are coupled to common comparand drivers 608. As such, during the compare operation, both of CAM arrays 602a and 602b are searched for a match with the comparand or search key. The compare operation may be masked by the mask data stored in one of global mask registers GM(1)–GM(z). Alternatively, a CAM block having multiple CAM arrays may be implemented with duplicate circuitry (e.g., a different comparand drivers and different global mask registers) for each of the CAM arrays.

During a compare operation, when CAM arrays 602a and 602b are searched for a match of the stored data with the appropriate data generated by comparand drivers 608, each matching location indicates a match on one of the sets of match lines 603a and 603b, respectively. Match lines 603a and 603b are coupled to match enable logic 628a (ENa) and match enable logic 628b (ENb), respectively. Match enable logic 628a and 628b are configured to receive BSEL signals 609a and 609b from block select circuits 605a and 605b, respectively. During a compare operation, the BSEL signals 609a and 609b enable one of the match enable logic circuits to drive the states of the match lines 603 for the CAM array 602a or 602b that has a stored CAM table ID that matches a CAM table ID received from search parameter table 525 of FIG. 5A. Conversely, BSEL signals 609a and 609b disable the match enable circuit 628a or 628b corresponding to a CAM array 602a or 602b that does not have a matching CAM table ID.

The BSEL signals 609a and 609b are also provided to select circuit 629. Select circuit 629 outputs the global mask select signals GMSELa 611a to global mask select circuit 607 if BSEL 609a is in an active state, outputs the global mask select signals GMSELb 611b to global mask select circuit 607 if BSEL 609b is in an active state. Global mask select circuit 607 and global mask registers 606 operate in a similar manner as discussed above in relation to FIG. 6. For an alternative embodiment, the global masks may not be used, and the registers 606, select circuit 629 and global mask select circuit 607 may not be needed.

In one particular embodiment, the CAM table IDs may be received from search parameter table 525. Alternatively, the search TIDs may received directly from an instruction decoder or other component without the use of a search parameter table to store search parameters corresponding to CAM arrays 602a and 602b.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A content addressable memory (CAM) device, comprising:
   a plurality of CAM blocks;
   a search parameter table coupled to the plurality of CAM blocks to store a plurality of search parameters, wherein the search parameter table comprises a plurality of registers; and
   circuitry to select one of the plurality of registers based on a selection code provided in association with a compare instruction, wherein each of the plurality of registers includes storage for at least one CAM table identifier that identifies a table, within one or more of the CAM blocks, that is to be searched in a compare operation.

2. The CAM device of claim 1, further comprising:
   an instruction decoder; and
   a search parameter table decoder coupled to the instruction decoder and the search parameter table, the search parameter table decoder including the circuitry to select the one of the plurality of registers based on the selection code.

3. The CAM device of claim 1, wherein each of the plurality of CAM blocks comprises:
   a CAM array;
   drivers coupled to the CAM array; and
   a block select circuit coupled to the search parameter table and the drivers.

4. The CAM device of claim 3, wherein each of the plurality of CAM blocks further comprises:
   a plurality of global mask registers coupled to the drivers; and
   a global mask select circuit coupled to the plurality of global mask registers and the block select circuit.

5. The CAM device of claim 1, further comprising:
   a device index generator coupled to the CAM blocks; and
   device flag logic coupled to the CAM blocks.

6. The CAM device of claim 1, wherein the search parameters comprise global mask register identifiers.

7. The CAM device of claim 1, further comprising a plurality of filter circuits coupled to the plurality of CAM blocks.

8. The CAM device of claim 4, wherein the global mask select circuit comprises:
   a select circuit; and
   a decoder coupled to the select circuit.

9. The CAM device of claim 3, wherein the block select circuit comprises:
   a storage element to store a table identifier;
   a plurality of compare circuits coupled to the storage element; and
   a logic gate coupled to the plurality of compare circuits.

10. The CAM device of claim 1, wherein each of the plurality of CAM blocks comprises:
    a plurality of CAM arrays each coupled to a corresponding match enabling logic; and
    a plurality of block select circuits coupled to the search parameter table, each of the plurality of block select circuits coupled to one of the corresponding match enabling logic.

11. The CAM device of claim 10, wherein each of the plurality of CAM blocks further comprises:
    drivers coupled to the plurality of CAM arrays;
    a plurality of global mask registers coupled to the drivers; and
    a global mask select circuit coupled to the search parameter table and the plurality of global mask registers.

12. The CAM device of claim 11, wherein each of the plurality of CAM blocks further comprises a select circuit coupled to the plurality of block select circuits and the global mask select circuit.

13. A method, comprising:
    receiving a selection code in a content addressable memory (CAM) device in association with a compare instruction, the CAM device having a plurality of CAM blocks;
    selecting one of a plurality of registers based on the selection code, wherein each of the plurality of registers includes storage for at least one CAM table identifier that identifies a table, within one or more of the CAM blocks, that is to be searched in one or more compare operations.

14. The method of claim 13, further comprising pre-programming the search parameters into a search parameter table.

15. The method of claim 14, wherein pre-programming comprises storing the search parameters in the one of the plurality of registers.

16. The method of claim 13, further comprising selecting, based on the selection code, one of a plurality of global masks to be used in the compare operation.

17. The method of claim 13, further comprising enabling the one or more of the CAM blocks to be searched in the compare operation.

18. The method of claim 13, further comprising performing the compare operation concurrently with at least one other compare operation.

19. A method, comprising:
    pre-programming a plurality of search parameters into respective registers of a search parameter table within a content addressable memory (CAM) device, each of the registers having storage for at least a first number of bits;
    selecting one of the search parameters using a selection code having fewer bits than the first number of bits;
    performing a plurality of concurrent compare operations in the CAM device using one or more of a plurality of CAM blocks identified by the selected one of the search parameters, wherein performing the plurality of concurrent compare operations comprises performing the plurality of concurrent compare operations in the CAM device based on the selected one of the search parameters; and
    wherein one of the compare operations is performed using a global mask identified by the selected one of the search parameters.

20. An apparatus, comprising:
    a search parameter table having a plurality of registers to store search parameters;
    means for receiving a selection code in a content addressable memory (CAM) device in association with a compare instruction, the CAM device having a plurality of CAM blocks; and
    means for selecting one of the plurality of registers based on the selection code, wherein each of the plurality of registers includes storage for at least one CAM table identifier that identifies a table, within one or more of the CAM blocks, that is to be searched in a compare operation.

21. The apparatus of claim 20, further comprising means for selecting one of a plurality of global masks to be used in the compare operation.

22. The apparatus of claim 21, further comprising means for selecting one of the plurality of CAM blocks to be used in one of the compare operations.

23. The apparatus of claim 22, further comprising means for concurrently performing the compare operation concurrently with at least one other compare operation.

24. The apparatus of claim 20, further comprising means for generating a comparand from input data to be used in the compare operation.

25. A content addressable memory (CAM) device, comprising:
    a plurality of CAM blocks;
    a search parameter table to store a plurality of table identifiers that correspond to respective lookup tables within the plurality of CAM blocks;
    circuitry to select at least one of the table identifiers based on a selection code received in association with a compare instruction; and
    circuitry to compare the at least one of the table identifiers with values associated with the CAM blocks to selectively enable the CAM blocks to participate in a compare operation.

26. The CAM device of claim 25, wherein each of the CAM blocks comprises a plurality of CAM arrays.

27. The CAM device of claim 25, wherein at least two of the lookup tables are stored, at least in part, in one of the CAM blocks.

28. The CAM device of claim 25, wherein at least one of the lookup tables is stored within two or more of the CAM blocks.

29. The CAM device of claim 25, wherein the search parameter table comprises a plurality of registers, each of the registers including storage for one or more of the table identifiers.

30. The CAM device of claim 25, wherein the values associated with the CAM blocks indicate a logical size of the CAM blocks.

31. The CAM device of claim 25, wherein the values associated with the CAM blocks indicate a type of data stored in the CAM blocks.

32. The CAM device of claim 25, wherein the values associated with the CAM blocks indicate a physical address of the CAM blocks.

33. A method of operation within a content addressable memory (CAM) device having a plurality of CAM blocks, the method comprising:

storing, in a search parameter table, a plurality of table identifiers that correspond to respective lookup tables within the plurality of CAM blocks;

selecting at least a first one of the table identifiers based on a selection code received in association with a compare instruction; and comparing the first one of the table identifiers with values associated with the CAM blocks to selectively enable the CAM blocks to participate in a compare operation.

34. The method of claim 33, wherein selecting comprises decoding the selection code.

35. The method of claim 33, further comprising pre-programming the table identifiers into the search parameter table.

36. The method of claim 35, wherein pre-programming the table identifiers into the search parameter table comprises storing the table identifiers in one of a plurality of registers within the search parameter table.

37. The method of claim 33, wherein comparing the first one of the table identifiers with values associated with the CAM blocks comprises comparing the first one of the table identifiers with a value that indicates a logical size of one of the CAM blocks.

38. The method of claim 33, wherein comparing the first one of the table identifiers with values associated with the CAM blocks comprises comparing the first one of the table identifiers with a value that indicates a type of data stored in one of the CAM blocks.

39. The method of claim 33, wherein comparing the first one of the table identifiers with values associated with the CAM blocks comprises comparing the first one of the table identifiers with a value that indicates a physical address of one of the CAM blocks.

\* \* \* \* \*